US012199382B2

(12) United States Patent
Kung

(10) Patent No.: US 12,199,382 B2
(45) Date of Patent: Jan. 14, 2025

(54) TWO-STAGE REAR COVER STRUCTURE OF INTEGRATED FEMALE CONNECTOR

(71) Applicant: Chiun Hui Technology Co., Ltd., New Taipei (TW)

(72) Inventor: Shu-Chu Kung, New Taipei (TW)

(73) Assignee: CHIUN HUI TECHNOLOGY CO., LTD., New Taipei (TW)

( * ) Notice: Subject to any disclaimer, the term of this patent is extended or adjusted under 35 U.S.C. 154(b) by 379 days.

(21) Appl. No.: 17/862,107

(22) Filed: Jul. 11, 2022

(65) Prior Publication Data

US 2024/0014606 A1 Jan. 11, 2024

(51) Int. Cl.
*H01R 13/506* (2006.01)
*H01R 13/504* (2006.01)
*H01R 13/6582* (2011.01)
*H01R 24/60* (2011.01)

(52) U.S. Cl.
CPC ..... *H01R 13/6582* (2013.01); *H01R 13/5045* (2013.01); *H01R 13/506* (2013.01)

(58) Field of Classification Search
CPC .............. H01R 13/5045; H01R 13/506; H01R 13/6582; H01R 13/6594; H01R 24/60; H01R 43/16
See application file for complete search history.

(56) References Cited

U.S. PATENT DOCUMENTS

| | | | | |
|---|---|---|---|---|
| 8,512,082 | B1 * | 8/2013 | Ku | H01R 12/58 439/676 |
| 8,602,825 | B2 * | 12/2013 | Chen | H01R 13/6658 439/660 |
| 2013/0252466 | A1 * | 9/2013 | Chen | H01R 13/6658 439/682 |
| 2017/0040749 | A1 * | 2/2017 | Tsai | H01R 13/502 |
| 2017/0194745 | A1 * | 7/2017 | Tsai | H01R 13/6594 |
| 2017/0346232 | A1 * | 11/2017 | Zhao | H01R 12/7005 |
| 2017/0352990 | A1 * | 12/2017 | Zhao | H01R 13/10 |
| 2021/0091500 | A1 * | 3/2021 | Chang | H01R 13/424 |
| 2022/0115812 | A1 * | 4/2022 | Kung | G06K 13/0856 |
| 2022/0239022 | A1 * | 7/2022 | Wang | H01R 24/60 |
| 2023/0077720 | A1 * | 3/2023 | Rossman | H01R 13/6585 439/607.46 |
| 2024/0014606 | A1 * | 1/2024 | Kung | H01R 13/506 |

* cited by examiner

*Primary Examiner* — Abdullah A Riyami
*Assistant Examiner* — Thang H Nguyen
(74) *Attorney, Agent, or Firm* — MUNCY, GEISSLER, OLDS & LOWE, P.C.

(57) ABSTRACT

A two-stage rear cover structure of integrated female connector includes a core body, terminals and a shielding shell. The terminals each have a butt end extending in one respective slit of a tongue portion of the core body, and a soldering end extending out of a positioning portion of the core body. The shielding shell has a shell body covering the core body, a rear cover portion attached to a step-shaped stopper portion of the core body, and a fixing portion accommodating the positioning portion of the core body. The above-mentioned components are used to avoid the interference of the electromagnetic wave of the external parts to the connector and prevent the connector from retreating and shaking when it is docked. It saves additional assembly cost and time with the integrated shielding shell.

7 Claims, 6 Drawing Sheets

TWO-STAGE REAR COVER STRUCTURE OF INTEGRATED FEMALE CONNECTOR

BACKGROUND OF THE INVENTION

1. Field of the Invention

The invention relates to a two-stage rear cover structure of integrated female connector, especially a step-shaped rear cover structure integrally formed on a shielding shell, which firmly supports and covers the core body to avoid the interference of electromagnetic waves from external parts to the connector, and prevent the connector from retreating and shaking when docking, which saves the cost and time of additional assembly with the one-piece shielding shell.

2. Description of the Related Art

With the rapid development of the technology industry, the popularity of electronic devices is getting higher and higher. With the popularization of electronic devices, the related connection devices also increase with the number of electronic devices.

With the development of connectors, the requirements for connector transmission performance also increase. Most of the female connectors are covered by metal shells to prevent electromagnetic wave interference, so that the internal equipment can transmit stably. However, in order to reliably prevent the interference of signals such as electromagnetic waves, the female connector of the connector is generally assembled through a plurality of metal sheets at the position where the connector assembly is not covered. It can not only prevent the interference of electromagnetic waves, but also fix the insulating base, core body or rubber core in the connector inside the metal shell. It prevents the insulating base, core body or rubber core inside the female connector from retreating or shaking out of the metal shell to affect the female connector data transmission when the male connector is plugged into or unplugged from the female connector. But it also increases the cost of redundant components and waste of space. That is the key to the research and improvement that those who are engaged in this industry are eager to study and improve.

SUMMARY OF THE INVENTION

Therefore, in view of the above problems and deficiencies, the inventor collected relevant information, evaluated and considered from various parties, and based on years of experience accumulated in this industry, through continuous trials and revisions, to design this kind of two-stage rear cover structure of integrated female connector.

It is therefore the main object of the present invention to provide a two-stage rear cover structure of integrated female connector, which comprises a core body, a plurality of terminals and a shielding shell. The core body comprises a tongue portion with a plurality of slits, a step-shaped stopper portion extended downward from one side of the tongue portion, and a positioning portion extended from the bottom side of the stopper portion for positioning. The terminals each comprise a butt end located on one side thereof and respectively extending in one respective slit of the tongue portion, and a soldering end located on an opposite side thereof and extending out of the positioning portion. The shielding shell comprises a shell body, an accommodating space defined in the shell body for accommodating the core body, an opening pierced through one side of the shell body to the accommodating space to accommodate the tongue portion, a docking port located on the shell body opposite to the opening and penetrating through the accommodating space, a rear cover portion extended from one side of the shell body in the direction of the docking port, and a fixing portion extended from the bottom side of the rear cover portion for accommodating the positioning portion of the core body. It saves the cost and time of additional assembly by the above-mentioned one-piece shielding shell construction. The step-shaped part of the step-shaped stopper portion is covered by the rear cover portion, so that the shielding shell achieves the effect of preventing the electromagnetic waves of external parts from interfering with the connector.

It is another main object of the present invention to provide a two-stage rear cover structure of integrated female connector, wherein the rear cover portion of the shielding shell is processed to provide a plurality of folded portions bent downward from the shell body, a stepped portion connected to the folded portions and attached to the stepped surface of the step-shaped stopper portion, and an extension portion extending downward from the stepped portion and attached to the non-stepped wall surface of the step-shaped stopper portion; the extension portion has two sides thereof respectively bent and extended with a side portion that is attached to one respective outer wall surface of the shell body, and each side portion of the extension portion is provided with a button hole; said shell body comprises two Z-shaped buckle blocks respectively provided on the two opposite outer wall surfaces thereof and respectively fastened to the button holes on the two sides of the extension portion; the rear cover portion further comprises a gap portion to make the rear cover portion easier to bend during the process, and the extension portion of the rear cover portion forms a connecting portion with a reinforcing structure to prevent excessive expansion of the gap portion. The structure of the rear cover portion is further strengthened by the above structure, so as to achieve the effect of preventing the retreat and shaking of the connector when it is connected.

It is still another main object of the present invention to provide a two-stage rear cover structure of integrated female connector, wherein the rear cover portion comprises at least one welding point provided on one side thereof for laser welding to the step-shaped stopper portion.

It is still another main object of the present invention to provide a two-stage rear cover structure of integrated female connector, wherein shield shell is a metal shell.

It is still another main object of the present invention to provide a two-stage rear cover structure of integrated female connector, wherein the terminals are embedded in the core body through the insert molding process.

DETAILED DESCRIPTION OF THE PREFERRED EMBODIMENT

Figure 1:
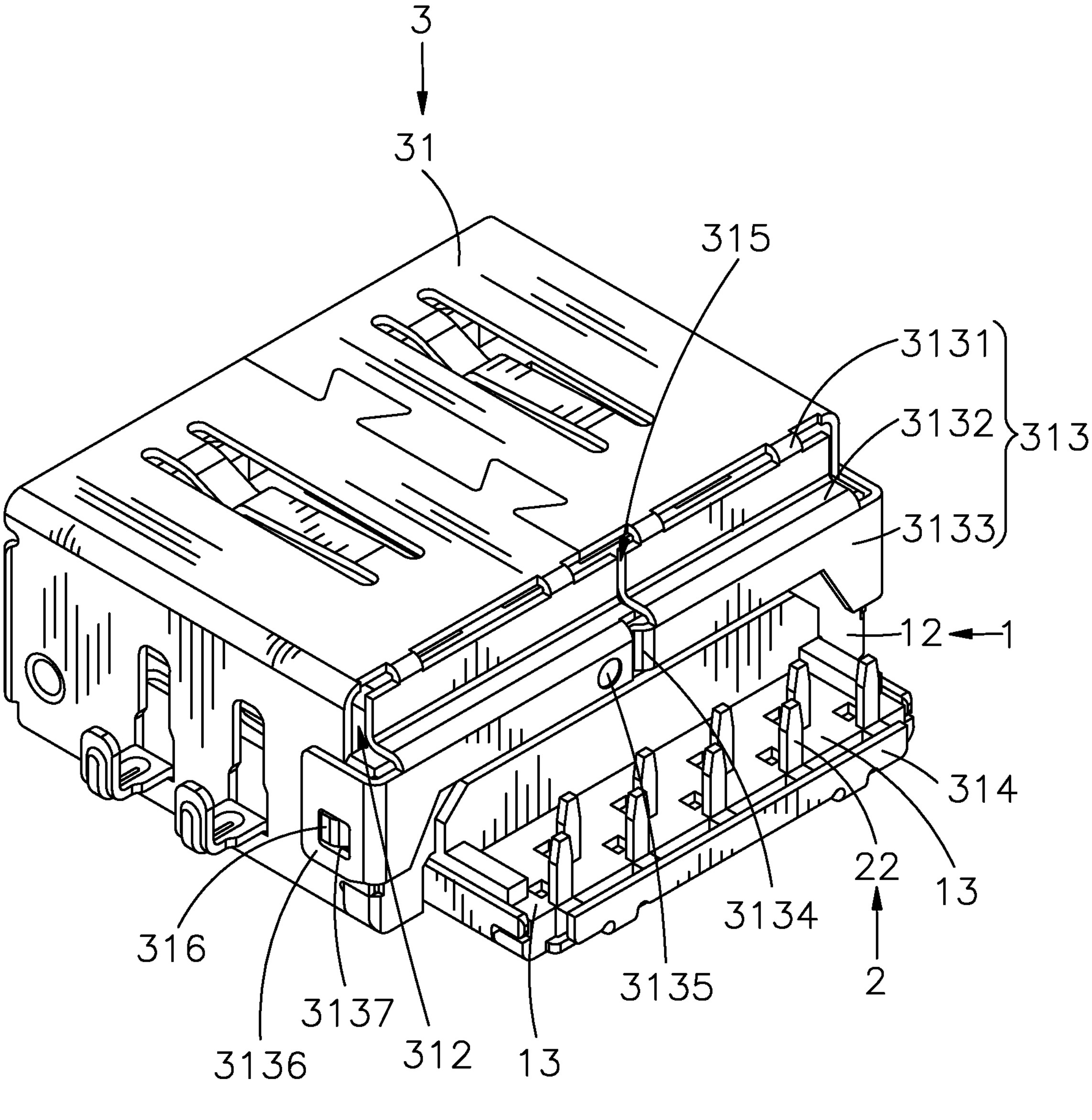
FIG. 1 is an oblique top elevational view of a two-stage rear cover structure of integrated female connector in accordance with the present invention.
Figure 2:
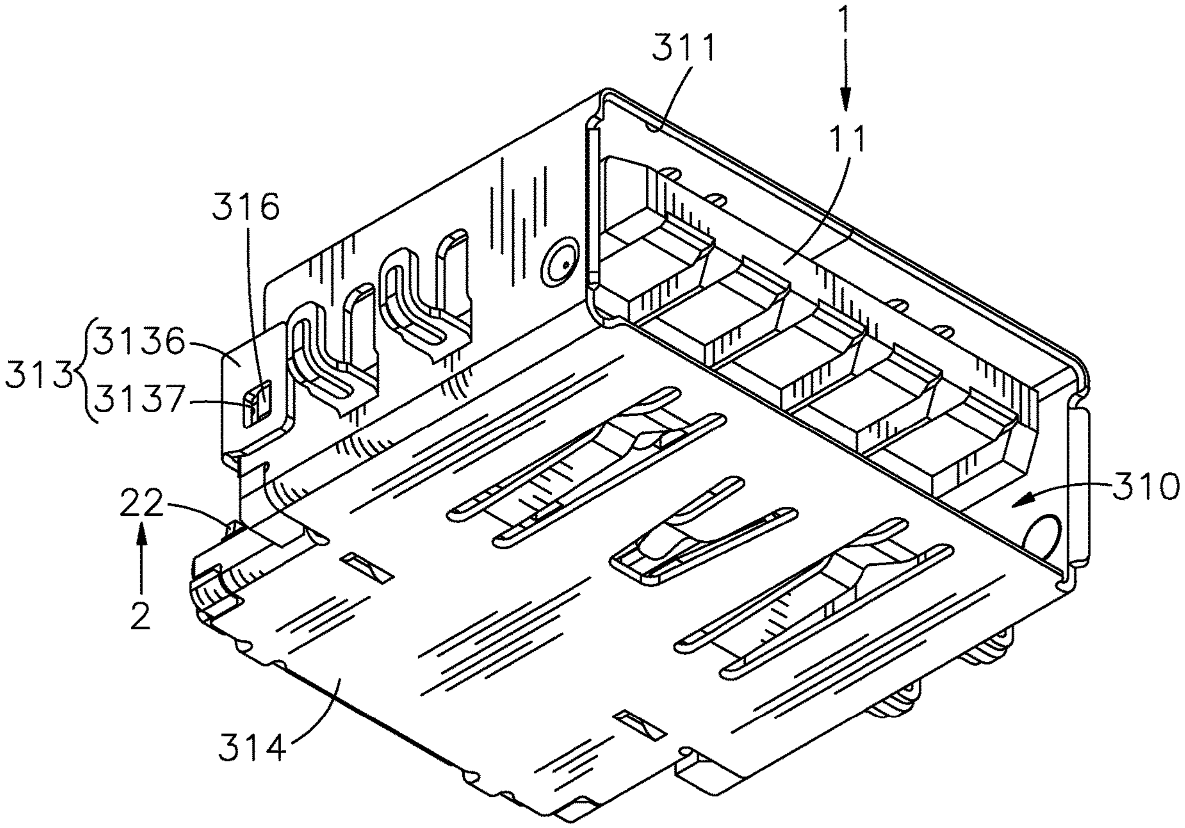
FIG. 2 is an oblique bottom elevational view of the two-stage rear cover structure of integrated female connector in accordance with the present invention.
Figure 3:
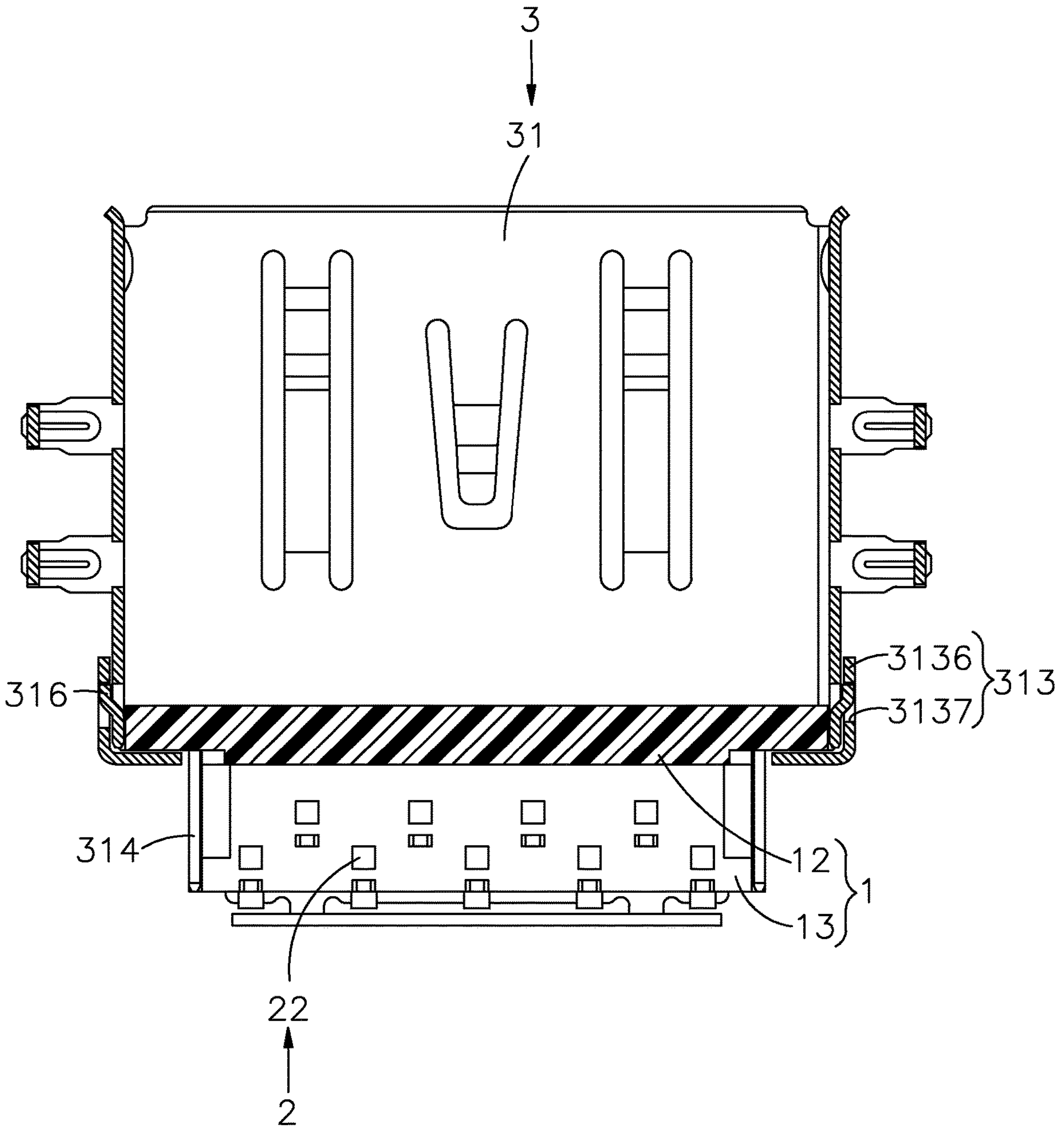
FIG. 3 is a sectional top view of the two-stage rear cover structure of integrated female connector in accordance with the present invention.
Figure 4:
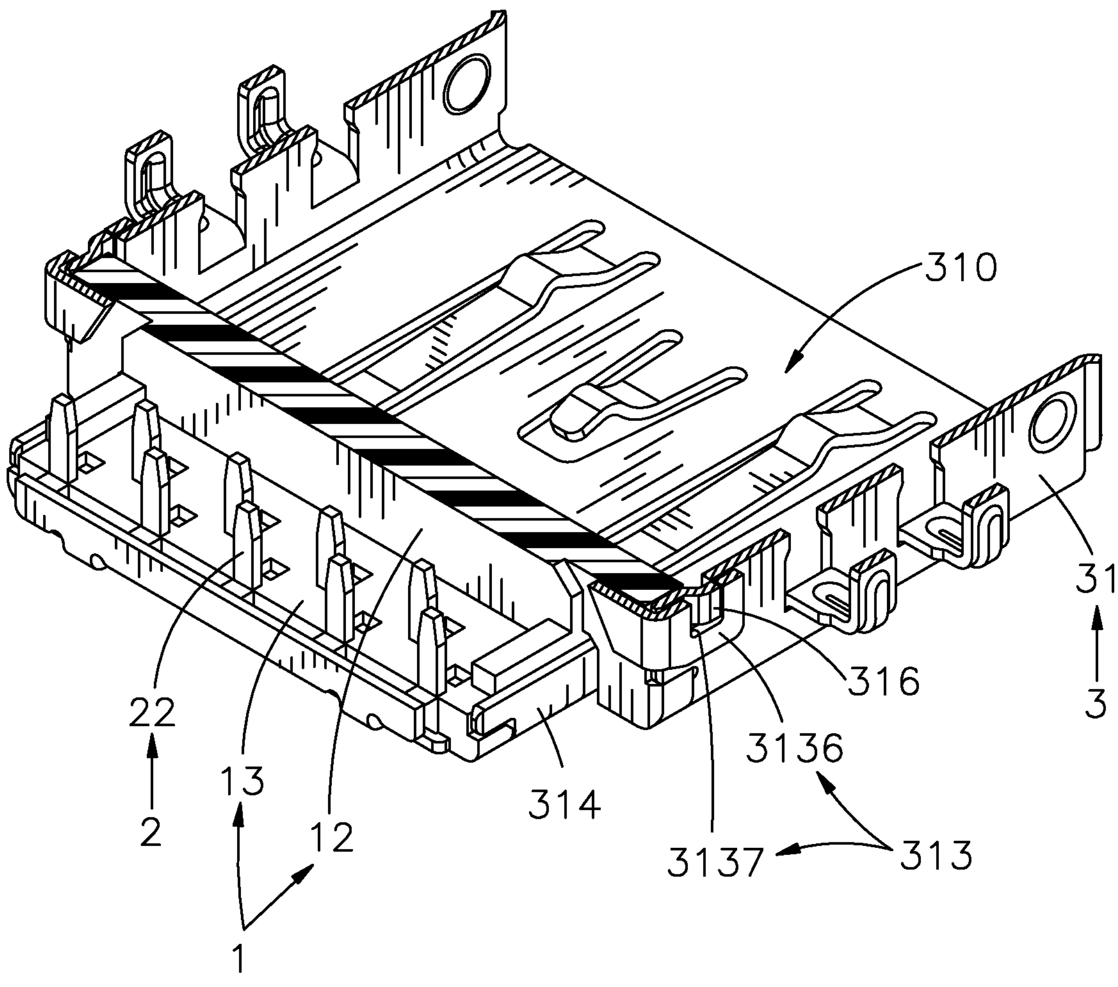
FIG. 4 is a sectional elevational view of the two-stage rear cover structure of integrated female connector in accordance with the present invention.

Please refer to FIGS. 1-4, where FIG. 1 is an oblique top elevational view of the present invention, FIG. 2 is an oblique bottom elevational view of the present invention, FIG. 3 is a sectional top view of the present invention, and FIG. 4 is a sectional elevational view of the present invention. As illustrated, the two-stage rear cover structure of integrated female connector of the present invention mainly comprises a core body 1, a plurality of terminals 2 and a shielding shell 3. The connection relationship of the aforementioned components is as follows:

The core body 1 comprises a tongue portion 11 with a plurality of slits 110, a step-shaped stopper portion 12 extended downward from one side of the tongue portion 11, and positioning portion 13 extended from a bottom side of the stopper portion 12 for positioning.

The plurality of terminals 2 are arranged in the core body 1. The terminals 2 each have a butt end 21 located on one side thereof and respectively extending in one respective slit 110 of the tongue portion 11, and a soldering end 22 located on an opposite side thereof and extending out of the positioning portion 13 for electrical connection of a preset electronic device (such as desktop computer, notebook computer, or tablet electronic equipment).

The shielding shell 3 is a metal shell. The shielding shell 3 comprises a shell body 31, an accommodating space 310 defined in the shell body 31 for accommodating the core body 1, an opening 311 pierced through one side of the shell body 31 to the accommodating space 310 to accommodate the tongue portion 11, a docking port 312 located on the shell body 31 opposite to the opening 311 and penetrating through the accommodating space 310, a rear cover portion 313 extended from one side of the shell body 31 in the direction of the docking port 312, and a fixing portion 314 extended from an opposite bottom side of the rear cover portion 313 for accommodating the positioning portion 13 of the core body 1.

Figure 5:
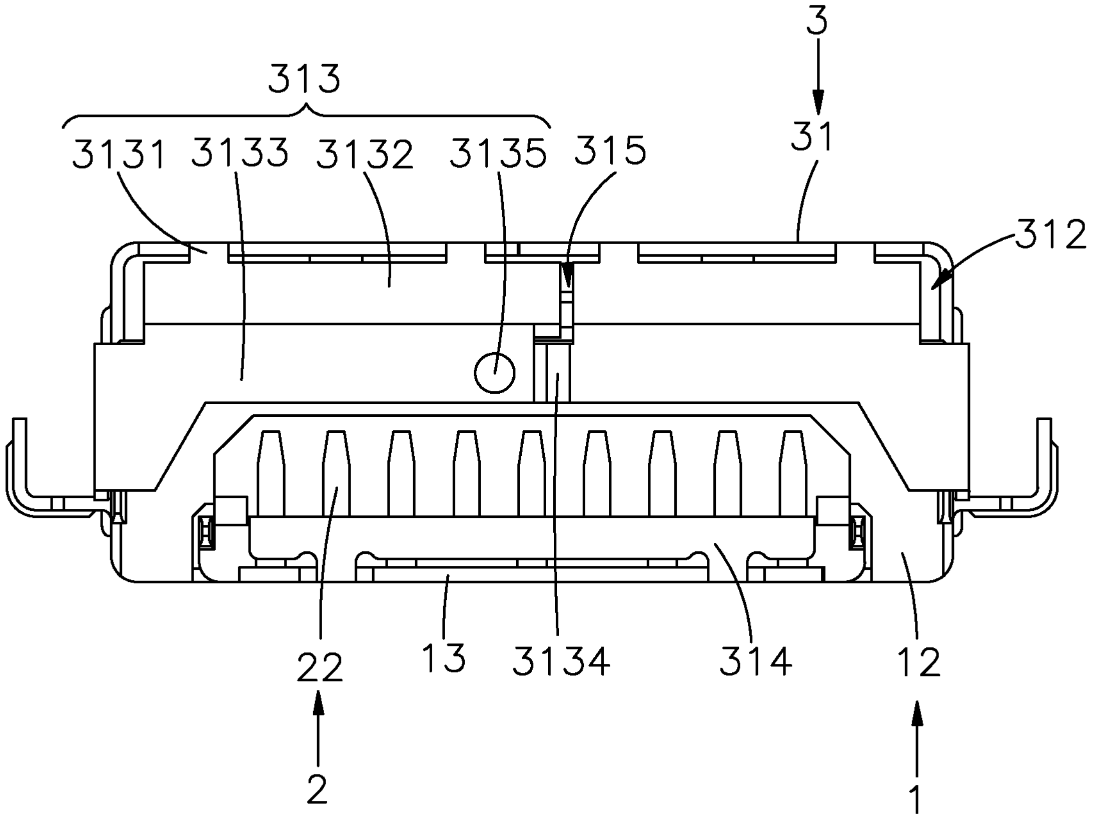
FIG. 5 is a rear side view of the two-stage rear cover structure of integrated female connector in accordance with the present invention.
Figure 6:
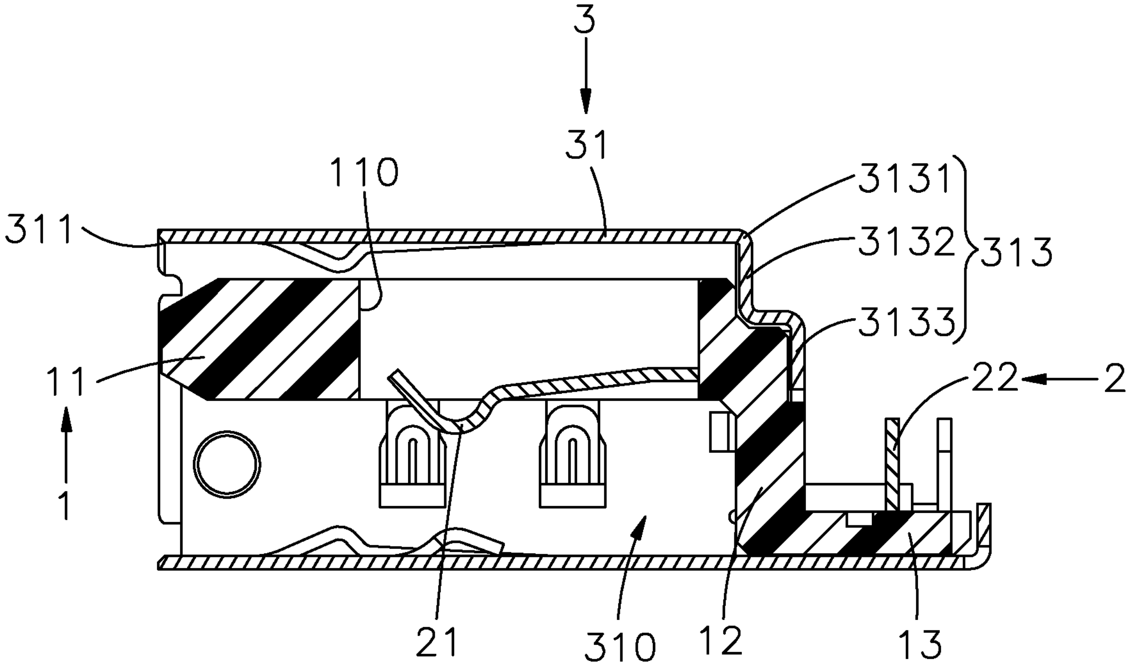
FIG. 6 is a sectional side view of the two-stage rear cover structure of integrated female connector in accordance with the present invention.

Please refer to FIGS. 3-6, where FIG. 3 is a sectional top view of the present invention, FIG. 4 is a sectional elevational view of the present invention, FIG. 5 is a rear side view of the present invention, and FIG. 6 is a sectional side view of the present invention.

It can be clearly seen from the figures that when the two-stage rear cover structure of integrated female connector of the present invention is to be assembled, the terminals 2 are first formed in the core body 1 through the insert molding process, so that the butt ends 21 of the terminals 2 are respectively penetrated into the slits 110 of the tongue portion 11, and the soldering ends 22 of the terminals 2 penetrate the surface of the positioning portion 13 of the core body 1. Then, pass the assembled core body 1 in the accommodating space 310 of the shielding shell 3 to insert the tongue portion 11 of the core body 1 into the opening 311 on the shell body 31 of the shielding shell 3 and to accommodate the step-shaped stopper portion 12 of the core body 1 in the docking port 312 on the shell body 31 of the shielding shell 3 and also to accommodate the positioning portion 13 of the core body 1 in the fixing portion 314 of the shell body 31 of the shielding shell 3.

After the positioning of the two-stage rear cover structure of integrated female connector of the present invention is completed, the rear cover portion 313 of the shielding shell 3 is processed to provide a plurality of folded portions 3131 bent downward from the shell body 31, a stepped portion 3132 connected to the folded portions 3131 and attached to the stepped surface on the step-shaped stopper portion 12, and an extension portion 3133 extending downward from the stepped portion 3132 and attached to the non-stepped wall surface of the step-shaped stopper portion 12. In this way, the shielding shell 3 completely covers the core body 1 and the plurality of terminals 2 to avoid the interference of electromagnetic waves from external parts and achieve the effect of shielding electromagnetic waves. Through the above-mentioned position of the stepped portion 3132 against the step-shaped stopper portion 12, it is possible to prevent the present invention from receiving a thrust force to cause the core body 1 to retreat and shake during butting when a predetermined male connector (not shown) is inserted and connected.

The rear cover portion 313 will have a gap portion 315 in the process of manufacturing, the gap portion 315 can make the rear cover portion 313 easier to bend during the process, and a connecting portion 3134 (as shown in FIG. 5) with a reinforcing structure to prevent excessive expansion of the gap portion 315 is formed between the extension portion 3133 of the rear cover portion 313. After the rear cover portion 313 is bent and attached to the step-shaped stopper portion 12, laser welding can be performed on at least one welding point 3135 provided on one side of the rear cover portion 313 to further strengthen the strength and fixation of the rear cover portion 313. Both sides of the extension portion 3133 are respectively bent and extended with a side portion 3136 that is attached to one respective outer wall surface of the shell body 31, and the side portion 3136 is provided with a button hole 3137 for a respective Z-shaped buckle block 316 provided on each of the two opposite outer wall surfaces of the shell body 31 to be snapped and positioned (as shown in FIGS. 3 and 4), so that the rear cover portion 313 can more stably locate the position of the core body 1.

The present invention mainly utilizes the rear cover portion 313 integrally formed on the shielding shell 3 to be bent down and positioned at the step-shaped stopper portion 12 of the core body 1 by post-processing. By welding the at least one welding point 3135 provided on the rear cover portion 313 of the shell body 31 to strengthen the structure of the gap portion 315 arranged on the rear cover portion 313, so that the shell body 31 and the rear cover portion 313 will not be impacted and displaced by the insertion force of the preset male connector. The position of the step-shaped stopper portion 12 of the core body 1 is covered by the stepped portion 3132 and the extension portion 3133 of the rear cover portion 313 in large quantities, so as to avoid the interference of electromagnetic waves from external parts. The invention takes advantage of the one-piece construction of the shielding shell 3 to save the cost and time of additional assembly.

When the two-stage rear cover structure of integrated female connector of the present invention is applied in practice, the above description is only a preferred embodiment of the present invention, and therefore does not limit the patent scope of the present invention. Therefore, all simple modifications and equivalent structural changes made by using the contents of the description and drawings of the present invention shall be similarly included in the patent scope of the present invention.

What the invention claimed is:

1. A two-stage rear cover structure of integrated female connector, comprising:

a core body comprising a tongue portion with a plurality of slits, a step-shaped stopper portion extended downward from one side of said tongue portion, and a positioning portion extended from a bottom side of said stopper portion for positioning;

a plurality of terminals arranged in said core body, said terminals each comprising a butt end located on one side thereof and respectively extending in one respective said slit of said tongue portion, and a soldering end located on an opposite side thereof and extending out of said positioning portion; and a shielding shell comprising a shell body, an accommodating space defined in said shell body for accommodating said core body, an opening pierced through one side of said shell body to said accommodating space to accommodate said tongue portion, a docking port located on said shell body opposite to said opening and penetrating through said accommodating space, a rear cover portion extended from one side of said shell body in the direction of said docking port, and a fixing portion extended from a bottom side of said rear cover portion for accommodating said positioning portion of said core body.

2. The two-stage rear cover structure of integrated female connector, as claimed in claim 1, wherein said rear cover portion of said shielding shell is processed to provide a plurality of folded portions bent downward from said shell body, a stepped portion connected to said folded portions and attached to a stepped surface of said step-shaped stopper portion, and an extension portion extending downward from said stepped portion and attached to a non-stepped wall surface of said step-shaped stopper portion.

3. The two-stage rear cover structure of integrated female connector, as claimed in claim 2, wherein said extension portion has two sides thereof respectively bent and extended with a side portion that is attached to one respective outer wall surface of said shell body, and each side portion of said extension portion is provided with a button hole; said shell body comprises two Z-shaped buckle blocks respectively provided on the two opposite outer wall surfaces thereof and respectively fastened to said button holes on the two sides of said extension portion.

4. The two-stage rear cover structure of integrated female connector, as claimed in claim 2, wherein said rear cover portion further comprises a gap portion to make said rear cover portion easier to bend during the process, and said extension portion of said rear cover portion forms a connecting portion with a reinforcing structure to prevent excessive expansion of said gap portion.

5. The two-stage rear cover structure of integrated female connector, as claimed in claim 1, wherein said rear cover portion comprises at least one welding point provided on one side thereof for laser welding to said step-shaped stopper portion.

6. The two-stage rear cover structure of integrated female connector, as claimed in claim 1, wherein said shield shell is a metal shell.

7. The two-stage rear cover structure of integrated female connector, as claimed in claim 1, wherein said terminals are embedded in said core body through the insert molding process.

* * * * *